(12) United States Patent
Wiley

(10) Patent No.: US 10,546,609 B2
(45) Date of Patent: *Jan. 28, 2020

(54) SYSTEM AND METHOD FOR MANUFACTURING A TAPE STORAGE DATA CARTRIDGE

(71) Applicant: Oracle International Corporation, Redwood Shores, CA (US)

(72) Inventor: Stephen A. Wiley, Parker, CO (US)

(73) Assignee: Oracle International Corporation, Redwood Shores, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/503,872

(22) Filed: Jul. 5, 2019

(65) Prior Publication Data

US 2019/0333537 A1  Oct. 31, 2019

Related U.S. Application Data

(63) Continuation of application No. 15/682,239, filed on Aug. 21, 2017, now Pat. No. 10,360,941.

(51) Int. Cl.
| | | |
|---|---|---|
| *G11B 23/50* | (2006.01) | |
| *G11B 5/78* | (2006.01) | |
| *G11B 5/84* | (2006.01) | |
| *G11B 20/12* | (2006.01) | |
| *G11B 23/08* | (2006.01) | |
| *G11B 23/113* | (2006.01) | |

(52) U.S. Cl.
CPC ............. *G11B 23/502* (2013.01); *G11B 5/78* (2013.01); *G11B 5/84* (2013.01); *G11B 20/1205* (2013.01); *G11B 23/08* (2013.01); *G11B 23/113* (2013.01)

(58) Field of Classification Search
None
See application file for complete search history.

(56) References Cited

U.S. PATENT DOCUMENTS

| | | |
|---|---|---|
| 4,213,222 A | 7/1980 | Schoettle et al. |
| 4,257,079 A | 3/1981 | Yoshizawa |
| 4,556,890 A | 12/1985 | Hermanson et al. |
| 5,015,430 A | 5/1991 | Suzuki et al. |
| 5,144,513 A | 9/1992 | Gadsby et al. |
| 10,360,941 B2 * | 7/2019 | Wiley .................. G11B 23/113 |
| 2003/0064666 A1 | 4/2003 | Tran et al. |
| 2003/0064667 A1 | 4/2003 | Tran et al. |
| 2004/0242130 A1 | 12/2004 | Kato et al. |

FOREIGN PATENT DOCUMENTS

| | | |
|---|---|---|
| JP | 62-026635 A | 2/1987 |
| JP | 01-106336 A | 4/1989 |
| JP | 08-315357 A | 11/1996 |
| JP | 2007-331074 A | 12/2007 |

* cited by examiner

*Primary Examiner* — Craig A. Renner
(74) *Attorney, Agent, or Firm* — Invoke

(57) ABSTRACT

A method of manufacturing magnetic tape storage data cartridges may include cutting a master tape having a first width into multiple tape sections that each have a smaller width than the first width, cleaning the tape sections to remove debris caused by the cutting, and writing the servo tracks on each tape section after the tape section is cleaned. The method may further include spooling each tape section into a respective tape cartridge after writing the servo track on the tape section.

12 Claims, 3 Drawing Sheets

SYSTEM AND METHOD FOR MANUFACTURING A TAPE STORAGE DATA CARTRIDGE

INCORPORATION BY REFERENCE; DISCLAIMER

The following application is hereby incorporated by reference: application Ser. No. 15/682,239 filed on Aug. 21, 2017. The Applicant hereby rescinds any disclaimer of claim scope in the parent application(s) or the prosecution history thereof and advises the USPTO that the claims in this application may be broader than any claim in the parent application(s).

TECHNICAL FIELD

The present disclosure relates to systems and methods for manufacturing tape storage data cartridges.

BACKGROUND

Magnetic tape data storage is a system for storing digital information on magnetic tape using digital recording. Magnetic tape is most commonly packaged in cartridges and cassettes. The device that performs writing or reading of data is a tape drive. Autoloaders and tape libraries automate cartridge handling. For example, a common cassette-based format is Linear Tape-Open, which comes in a variety of densities and is manufactured by several companies.

Manufacturing tape storage data cartridges includes cutting a master tape into tape sections, writing servo tracks on the tape sections, and spooling the tape sections into tape cartridges. The process of cutting the master tape into tape sections, during the manufacturing of tape storage data cartridges, generates debris onto the tape sections which may affect the longevity of the tape sections.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The embodiments are illustrated by way of example and not by way of limitation in the figures of the accompanying drawings. It should be noted that references to "an" or "one" embodiment in this disclosure are not necessarily to the same embodiment, and they mean at least one. In the drawings.

DETAILED DESCRIPTION

In the following description, for the purposes of explanation, numerous specific details are set forth in order to provide a thorough understanding. One or more embodiments may be practiced without these specific details. Features described in one embodiment may be combined with features described in a different embodiment. In some examples, well-known structures and devices are described with reference to a block diagram form in order to avoid unnecessarily obscuring the present invention.

1. GENERAL OVERVIEW
2. SYSTEM FOR MANUFACTURING MAGNETIC TAPE DATA STORAGE CARTRIDGES
3. MISCELLANEOUS; EXTENSIONS

1. General Overview

In an embodiment, manufacturing magnetic tape storage cartridges may include cutting a master tape having a first width into multiple tape sections that each have a smaller width than the first width, cleaning the tape sections to remove debris caused by the cutting, and writing the servo tracks on each tape section after the tape section is cleaned. The method may further include spooling each tape section into a respective tape cartridge after writing the servo tracks on the tape section.

In an embodiment, manufacturing magnetic tape cartridges may include cutting a master tape having a first width into multiple tape sections that each have a smaller width than the first width, and cleaning the tape sections to remove debris caused by the cutting. In addition, the method may include spooling the tape sections into tape cartridges that are usable with a tape drive, such that each data tape section manufactured is cleaned prior to being spooled into a respective one of the tape cartridges.

One or more embodiments include a system for manufacturing tape storage data cartridges for use with a tape drive. The system may include a cutting station for cutting a master tape having a first width into multiple tape sections that each have a smaller width than the first width, and a cleaning device for cleaning the tape sections. The system may also include a spooling station for spooling the tape sections into tape cartridges, wherein the spooling station is arranged downstream of the cleaning device relative to a processing direction of the system. In an embodiment, the system is configured to use the tape cleaning device when manufacturing tape storage data cartridges and configured to refrain from using the tape cleaning device when manufacturing tape cleaning cartridges. As a result, tape spooled into tape cleaning cartridges will have an abrasive texture due to the debris.

One or more embodiments described in this Specification and/or recited in the claims may not be included in this General Overview section.

2. System for Manufacturing Magnetic Tape Data Storage Cartridges

Figure 1:
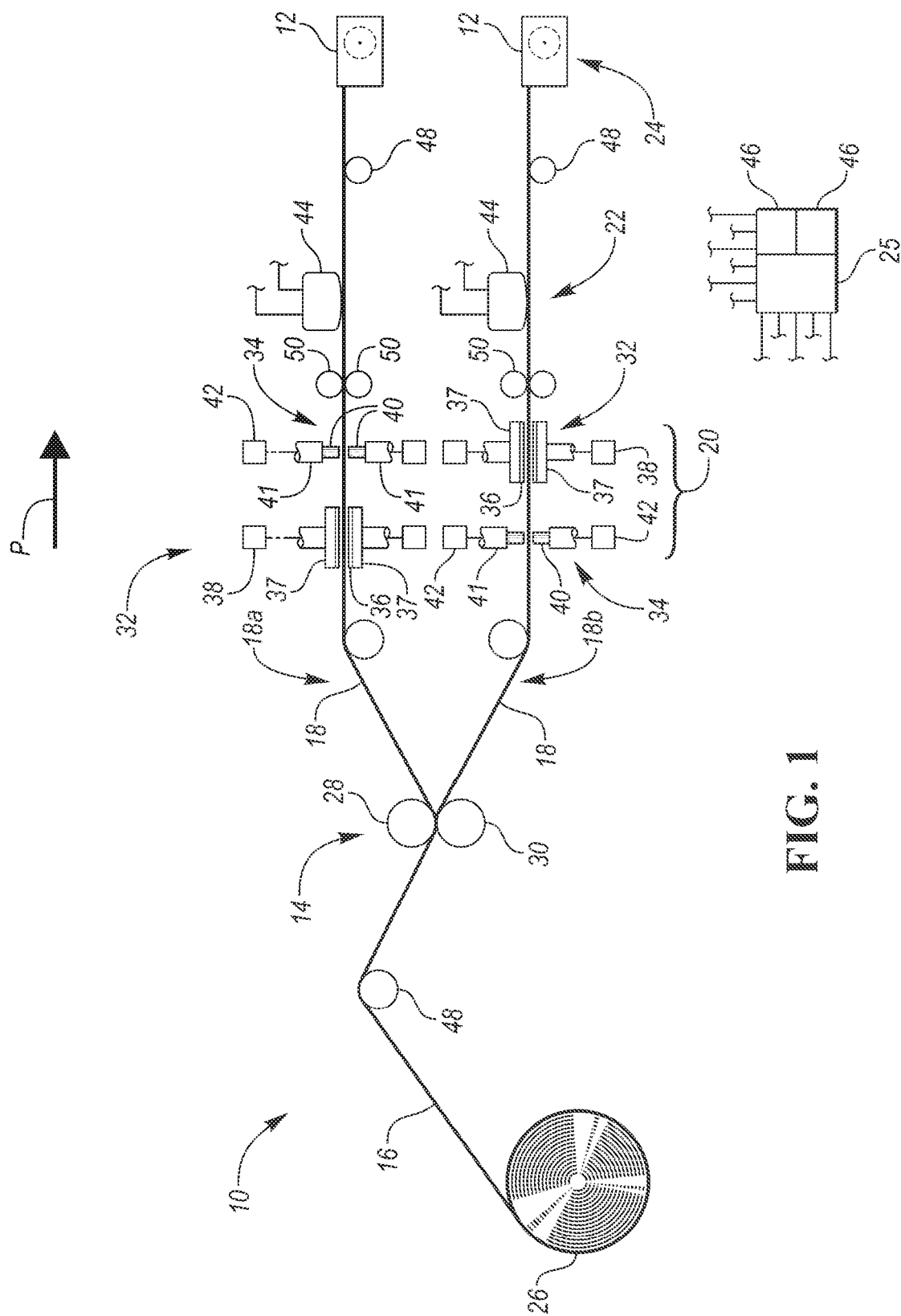
FIG. 1 illustrates a schematic view of a system according to the disclosure for manufacturing tape cartridges.
Figure 2:
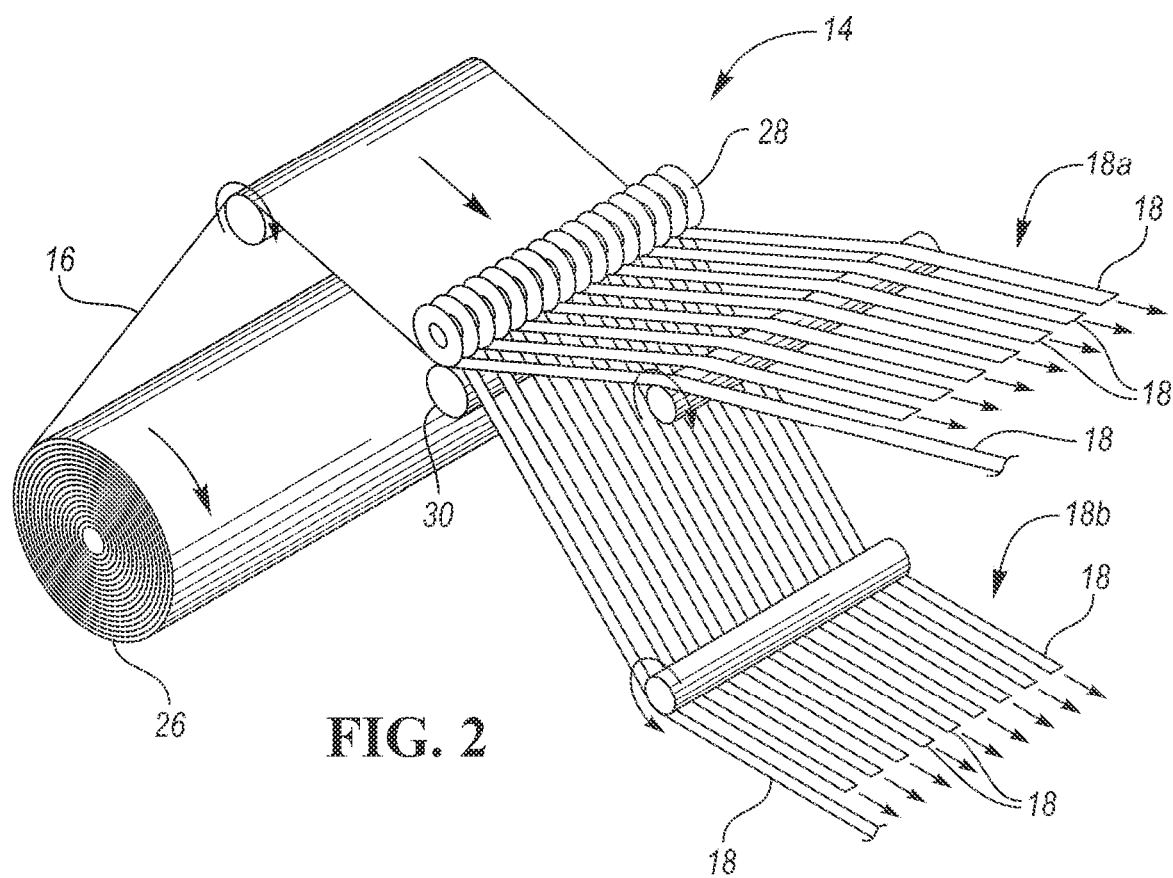
FIG. 2 illustrates a perspective view of a portion of the system shown in FIG. 1 and showing a cutting station of the system.

FIG. 1 illustrates a system 10 in accordance with one or more embodiments. FIG. 2 illustrates a perspective view of a portion of system 10. In one or more embodiments, the system 10 may include more or fewer components than the components illustrated in FIG. 1. The components illustrated in FIG. 1 may be local to or remote from each other. The components illustrated in FIG. 1 may be implemented in software and/or hardware. Each component may be distributed over multiple applications and/or machines. Multiple components may be combined into one application and/or machine. Operations described with respect to one component may instead be performed by another component.

System 10 is a system for manufacturing magnetic tape storage data cartridges 12 for use with a tape drive (not shown). The system 10 includes a cutting station 14 for cutting magnetic tape 16 into multiple tape sections 18, a cleaning station 20 for cleaning the tape sections 18, a servo track writing station 22 for writing servo tracks on the tape sections 18, and a spooling station 24 for spooling the tape sections 18 into the tape cartridges 12. The system 10 further includes a control arrangement 25 for controlling operation of the stations.

As shown in FIG. 1, the magnetic tape 16, which may be referred to as a master tape, may be supplied from a supply roll 26, such as a master supply roll or tape master roll. The magnetic tape 16 may be made of any suitable material, such as a plastic film having a magnetizable coating and/or embedded magnetic particles, and may have any suitable size. For example, the magnetic tape 16 may have a width in the range of 2 to 5 feet, or greater, and a length of several hundred feet or several thousand feet or even greater.

Referring to FIGS. 1 and 2, the cutting station 14 includes one or more cutting devices for slitting or cutting the magnetic tape 16 into the tape sections 18, so that each tape section 18 has a smaller width than the width of the magnetic tape 16. For example, each tape section 18 may be cut to a width of about ½ inch. In the embodiment shown in FIGS. 1 and 2, the cutting station 14 includes upper and lower cutting devices 28 and 30, respectively, such as upper and lower circular cutters, respectively. Although only two tape sections 18 are visible in FIG. 1, the magnetic tape 16 may actually be cut into two or more groups of tape sections 18, such as first and second groups or upper and lower groups 18a and 18b, respectively, of tape sections 18 as shown in FIG. 2, and each group of tape sections 18 may include multiple tape sections 18, such as two or more tape sections 18. In the embodiment shown in FIG. 2, for example, the upper group 18a includes eight tape sections 18, and the lower group 18b includes ten tape sections 18. In another embodiment, the upper group 18a may include 10 or more (e.g., 20, 30, 40, or even more) tape sections 18, and the lower group 18b may likewise include 10 or more (e.g., 20, 30, 40, or even more) tape sections 18.

The cleaning station 20 may include one or more cleaning systems or devices for cleaning the tape sections 18. As illustrated in FIG. 1, the cleaning station 20 may include multiple gauze cleaning systems or devices 32 (e.g., automated gauze cleaning systems or devices) and multiple brush cleaning systems or devices 34 (e.g., automated brush cleaning systems or devices) that are each configured to clean one or more tape sections 18.

In an embodiment, the cleaning station 20 is arranged downstream of the cutting station 14 relative to a processing direction P of the system 10, so that cleaning of the tape sections 18 can be performed immediately after cutting of the tape sections 18. In another embodiment, one or more cleaning systems or devices may be provided at the cutting station 14 so that cleaning of the tape sections 18 may be performed simultaneously with cutting of the tape sections 18.

Each gauze cleaning device 32 may include one or more gauze members 36 (e.g., pads, sheets, panels, etc.) supported on one or more gauze heads 37 that may be movable with respect to one or more tape sections 18 for cleaning the tape sections 18. For example, each gauze cleaning device 32 may include one or more actuators 38 connected to the gauze heads 37 for automatically moving the gauze heads 37 toward and away from one or more tape sections 18 and/or in one or more directions parallel to the tape sections 18 (e.g., in a direction of travel of the tape sections 18 and/or in a direction perpendicular to the direction of travel of the tape sections). In one embodiment, the gauze members 36 of each particular gauze cleaning device 32 may be provided on a continuous supply roll (not shown) so that gauze members 36 may be automatically fed to the corresponding one or more gauze heads 37 as needed to ensure that the one or more gauze members 36 in contact with one or more tape sections 18 remain sufficiently clean.

Each brush cleaning device 34 may include one or more brush members 40 mounted on one or more brush heads 41, and one or more actuators 42 for moving the brush heads 41 with respect to one or more tape sections 18 for cleaning the tape sections 18. As another example, the brush heads 41 may remain stationary during a particular cleaning process and the brush members 40 may flex or otherwise move with respect to the brush heads 41.

The cleaning devices 32 and 34 may be arranged in any suitable order. For example, the brush cleaning devices 34 may be arranged downstream or upstream of the gauze cleaning devices 32.

In the embodiment shown in FIG. 1, the servo track writing station 22 is arranged downstream of the cleaning station 20 relative to the processing direction P of the system 10. Furthermore, the servo track writing station 22 includes one or more writing devices, such as magnetic write heads 44, for writing servo tracks on the tape sections 18. For example, the servo track writing station 22 may include one or more upper heads 44 for writing servo tracks on the upper group 18a of tape sections 18, and one or more lower heads 44 for writing servo tracks on the lower group 18b of tape sections 18.

The spooling station 24 is arranged downstream of the servo track writing station 22 and is configured for spooling the tape sections 18 into the tape cartridges 12. For example, the spooling station 24 may include a winding device for each tape cartridge 12, and each winding device may be configured to be connected to a take-up reel of a particular tape cartridge 12 and to rotate the take-up reel so as to wind a particular tape section 18 onto the take-up reel.

The control arrangement 25 may include one or more controllers or control units 46 that are configured to communicate with the stations 14, 20, 22 and 24 and other components of the system 10 to control operation of the stations and other components of the system 10. The control units 46 may include suitable inputs for receiving information from the stations 14, 20, 22 and 24 (e.g., systems, devices and other components, such as sensors, at the stations), as well as other components of the system 10, and suitable outputs for providing information to the stations and other components of the system 10. The control units 46 and any other system, subsystem, device, unit, or component described herein may individually, collectively, or in any combination comprise appropriate circuitry, such as one or more appropriately programmed processors (e.g., one or more microprocessors including central processing units) and associated memory, which may include stored operating system software and/or application software (e.g., computer readable program instructions) executable by the processor (s) for controlling operation thereof and for performing the particular algorithms represented by the various functions and/or operations described herein, including interaction between and/or cooperation with each other. One or more of such processors, as well as other circuitry and/or hardware may be included in a single ASIC (Application-Specific Integrated Circuitry), or several processors and various circuitry and/or hardware may be distributed among several separate components, whether individually packaged or assembled into a SoC (System-on-a-Chip).

One or more embodiments include a method of manufacturing the tape cartridges 12. Components of the system 10, described above, and/or other components may execute the method. System components, executing the method, may be controlled by the control arrangement 25 so that the method may be performed automatically.

The method may include supplying the magnetic tape 16 to the cutting station 14, such as by unwinding the magnetic tape 16 from the supply roll 26, and feeding the magnetic tape 16 over, under or around one or more guides, such as rollers 48, until the magnetic tape 16 reaches the cutting station 14. The method may further include cutting the magnetic tape 16 at the cutting station 14 (e.g., using the cutting devices 28 and 30) into multiple tape sections 18. As mentioned above, the magnetic tape 16 has a first width, and each tape section 18 has a smaller width than the first width.

The method further include cleaning the tape sections 18 to remove debris caused by the cutting. As mentioned above, the cleaning may occur during or after the cutting. In the embodiment shown in FIG. 1, the cleaning occurs at the cleaning station 20, which may include two cleaning devices 32, 34 for each tape section 18 or group of tape sections 18 (e.g., upper group 18a of tape sections 18 and lower group 18b of tape sections 18).

The method may further include writing servo tracks on at least one of the tape sections 18 after the cleaning operation. In at least one embodiment, the servo track writing station 22 is configured to write at least one servo track on each tape section 18 after the cleaning. For example, the one or more upper heads 44 may be used to write at least one servo track on each tape section 18 of the upper group 18a, and the one or more lower heads 44 may be used to write at least one servo track on each tape section 18 of the lower group 18b. Furthermore, the servo tracks may be used to properly position the tape sections 18 during use of the corresponding tape cartridges 12 in one or more tape drives. For example, a particular servo track may be read by a servo system of a particular tape drive, and a positioning mechanism of the servo system may then be used to properly position the corresponding tape section 18 for read and/or write operations in the tape drive.

The tape sections 18 may also be smoothed or flattened by one or more smoothing devices, such as smoothing rollers 50, prior to the tape sections 18 reaching the servo track writing station 22. As result of cleaning prior to writing the servo tracks, the servo tracks may be more accurately written to the tape sections 18 at the servo track writing station 22 than writing the servo tracks without prior cleaning.

The method may further include spooling the tape sections 18 into the tape cartridges 12 at the spooling station 24. With the above configuration, each tape section 18 is cleaned prior to being spooled into a particular tape cartridge 12. If the method involves writing a servo track on each tape section 18 as explained above, then such writing on each tape section 18 may also be performed prior to spooling the tape section 18 into a particular tape cartridge 12.

Because cleaning of a particular tape section 18 is performed prior to spooling the tape section 18 into any tape cartridge 12, debris generated by the cutting process and introduced into a particular tape cartridge 12 may be substantially reduced or eliminated. As result, usable life of the tape cartridge 12 may be significantly increased. Likewise, since debris introduced into a tape drive by the tape cartridge 12 may be substantially reduced or eliminated, usable life of the tape drive may be significantly increased. For example, magnetic heads (e.g., read and/or write heads) and guides of the tape drive may last significantly longer.

Figure 3:
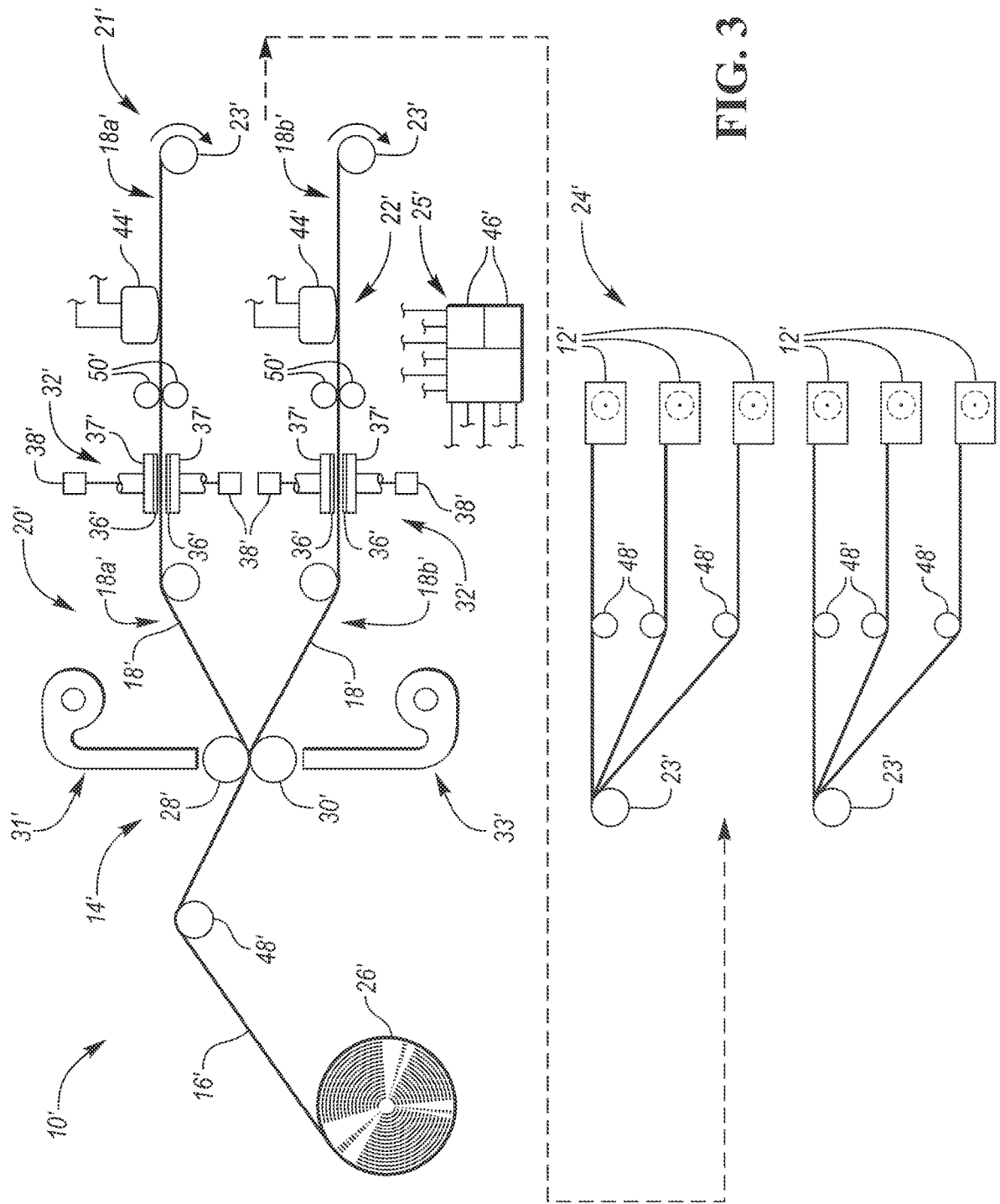
FIG. 3 illustrates a schematic view of another embodiment of a system according to the disclosure for manufacturing tape storage data cartridges.

Referring to FIG. 3, a second embodiment 10' of a system according to the present disclosure is shown. The system 10' is similar to the system 10 shown in FIG. 1, and the same or similar features or components of the two embodiments are identified with the same reference numerals, except each reference numeral of the system 10' includes a prime mark. Furthermore, the description of components of the system 10 provided above applies to the same or similar components of the system 10'.

With the system 10', at least a portion of cleaning station 20' overlaps with cutting station 14'. In the embodiment shown in FIG. 3, for example, the cleaning station 20' includes a blower cleaning system or device 31' and a vacuum or suction cleaning system or device 33' that are respectively positioned above and below cutting devices 28' and 30'. Those cleaning devices 31' and 33' are configured to remove debris from tape sections 18' as the debris is generated during cutting of magnetic tape 16' at the cutting station 14', so that cleaning of the tape sections 18' may be performed simultaneously with the cutting of the magnetic tape 16'. In the embalming shown in FIG. 3, the blower cleaning device 31' is operable to blow debris off tape sections 18' during cutting at the cutting station 14', and the suction cleaning device 33' is operable to draw debris from the tape sections 18' and collect the debris in a receptacle (not shown). In another embodiment, the cleaning station 20' may be provided with multiple blower cleaning devices 31' and multiple suction cleaning devices 33'.

The cleaning station 20' may further include one or more cleaning systems or devices disposed downstream of the cutting station 14'. In the embodiment shown in FIG. 3, for example, the cleaning station 20' includes multiple gauze cleaning systems or devices 32' having the same or similar configuration as the gauze cleaning devices 32 discussed above in detail.

In the embodiment, as illustrated in FIG. 3, the system 10' includes an intermediate winding or spooling station 21' disposed downstream of servo track writing station 22'. At the intermediate spooling station 21', multiple groups of tape sections 18', such as first and second groups or upper and lower groups 18a' and 18b', respectively, of tape sections 18' may be wound onto intermediate rolls 23'. Those rolls 23' may then be transferred to another location in the same manufacturing plant, or another manufacturing plant, where the groups of tape sections 18' may be unwound from the intermediate rolls 23' and spooled into tape cartridges 12' at spooling station 24'. In another embodiment, the tape sections 18' may be spooled directly into the tape cartridges 12' immediately downstream of the servo track writing station 22', as with the system 10.

One or more embodiments include a method of manufacturing the tape cartridges 12' using the system 10' that is similar to the method described above using the system 10. As result, similar steps using the system 10' are not described herein. With the system 10', however, cutting of the magnetic tape 16' into the tape sections 18' and cleaning of the tape sections 18' may be performed simultaneously, using any suitable cleaning devices, such as the blower cleaning device 31' and the suction cleaning device 33'. Additional cleaning of the tape sections 18' may also be performed downstream of the cutting station 14' using other suitable cleaning devices, such as the gauze cleaning devices 32'.

In addition, spooling of the tape sections 18' may occur first at the intermediate spooling station 21', so that spooling of the tape sections 18' into the tape cartridges 12' may subsequently occur at the spooling station 24', which may be positioned at a different location than the spooling station 21', if desired. In any case, with the above method, each tape section 18' may be cleaned prior to spooling such tape section 18' into any tape cartridge 12'.

3. Miscellaneous; Extensions

Any combination of the features and functionalities described herein may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A system for manufacturing tape cartridges for use with a tape drive, the system comprising:
    a cutting station for cutting a master tape having a first width into a plurality of tape sections that each have a smaller width than the first width;
    a cleaning device for cleaning at least a subset of the plurality of the tape sections to remove debris caused by the cutting station, the cleaning device comprising at least one gauze cleaning head connected to an actuator configured to move the gauze cleaning head (a) in a first direction toward and away from one or more of the subset of the plurality of tape sections and/or (b) in a second direction parallel to the one or more of the subset of the plurality of tape sections; and
    a spooling station for spooling each tape section of the plurality of tape sections into tape cartridges,
    wherein at least a portion of the cleaning device is arranged between the cutting station and the spooling station relative to the processing direction of the system.

2. The system of claim 1 wherein another portion of the cleaning device is arranged at the cutting station so that the cleaning can be performed simultaneously with the cutting.

3. The system of claim 1 wherein the cleaning device further comprises a suction device.

4. The system of claim 1 wherein the cleaning device further comprises a blower device.

5. The system of claim 1 wherein the cleaning device further comprises a brush system.

6. The system of claim 1 further comprising a control arrangement configured to control operation of the system.

7. A system for manufacturing tape cartridges for use with a tape drive, the system comprising:
    a cutting station for cutting a master tape having a first width into a plurality of tape sections that each have a smaller width than the first width;
    a cleaning device for cleaning at least a subset of the plurality of the tape sections to remove debris caused by the cutting station, the cleaning device comprising at least one gauze cleaning head connected to an actuator configured to move the gauze cleaning head (a) in a first direction toward and away from one or more of the subset of the plurality of tape sections and/or (b) in a second direction parallel to the one or more of the subset of the plurality of tape sections;
    a writing station configured to write a servo track on each tape section of at least the subset of the plurality of tape sections after each tape section is cleaned; and
    a spooling station for spooling each tape section of the plurality of tape sections into tape cartridges,
    wherein at least a portion of the cleaning device is arranged between the cutting station and the spooling station relative to the processing direction of the system.

8. The system of claim 7 wherein another portion of the cleaning device is arranged at the cutting station so that the cleaning can be performed simultaneously with the cutting.

9. The system of claim 7 wherein the cleaning device further comprises a suction device.

10. The system of claim 7 wherein the cleaning device further comprises a blower device.

11. The system of claim 7 wherein the cleaning device further comprises a brush system.

12. The system of claim 7 further comprising a control arrangement configured to control operation of the system.

* * * * *